Figure 1:
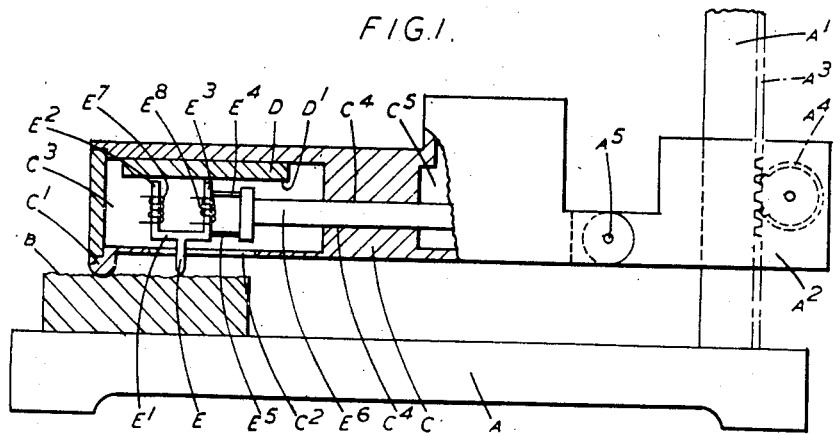

May 24, 1949.    R. E. REASON    2,471,009
APPARATUS FOR MEASURING OR INDICATING THE
ROUGHNESS OR UNDULATIONS OF SURFACES
Filed Aug. 15, 1944    3 Sheets-Sheet 1

Inventor
RICHARD EDMUND REASON
By
Query Holcombe & Blair
Attorney

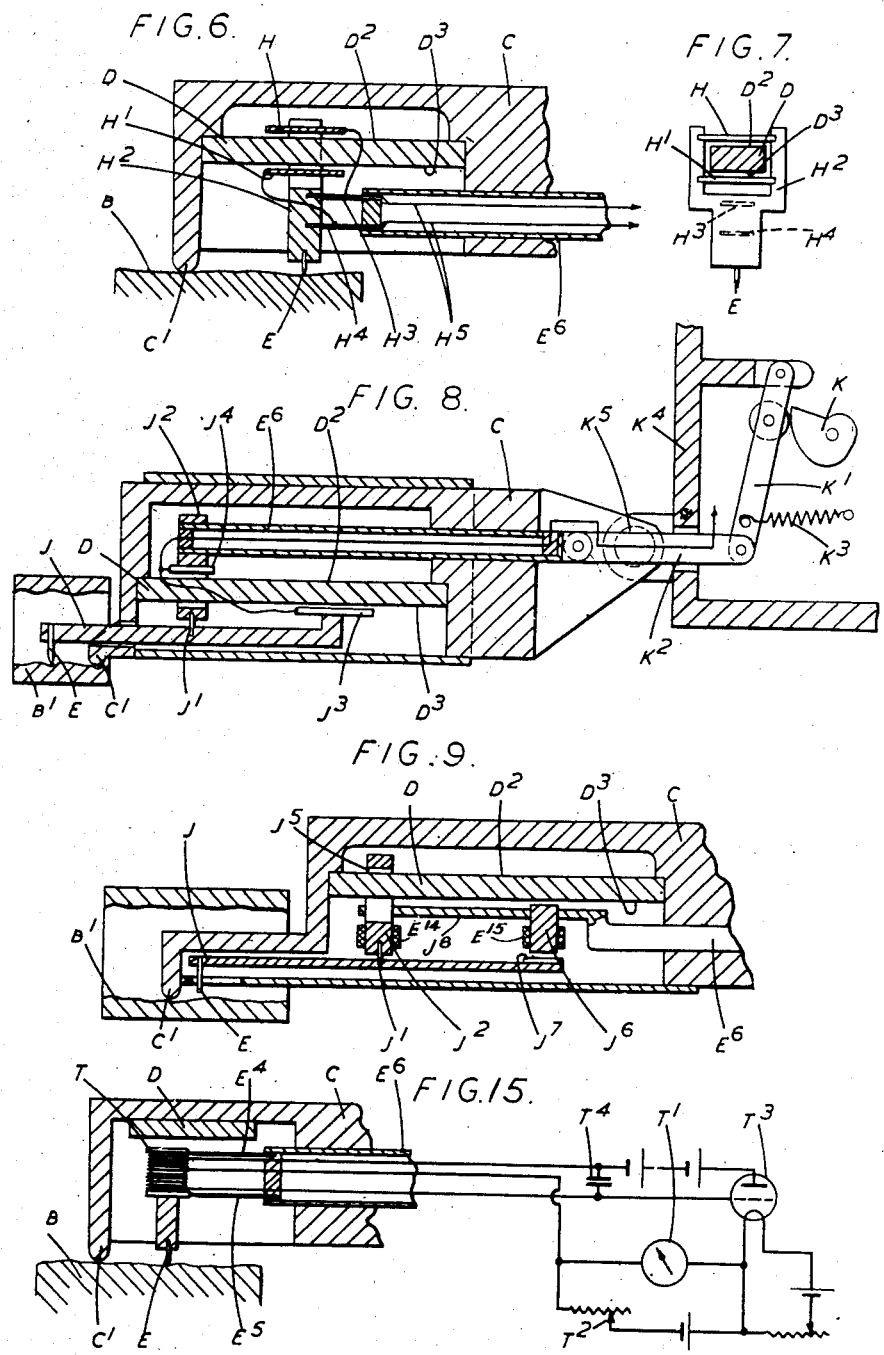

May 24, 1949.   R. E. REASON   2,471,009
APPARATUS FOR MEASURING OR INDICATING THE
ROUGHNESS OR UNDULATIONS OF SURFACES
Filed Aug. 15, 1944                                  3 Sheets-Sheet 3

Inventor
RICHARD EDMUND
REASON
By
Emery Holcombe H Blair
Attorney

Patented May 24, 1949

2,471,009

UNITED STATES PATENT OFFICE 2,471,009

APPARATUS FOR MEASURING OR INDICATING THE ROUGHNESS OR UNDULATIONS OF SURFACES

Richard Edmund Reason, Leicester, England, assignor to Taylor, Taylor & Hobson Limited, Leicester, England, a company of Great Britain Application August 15, 1944, Serial No. 549,580
In Great Britain May 13, 1943

Section 1, Public Law 690, August 8, 1946
Patent expires May 13, 1963

19 Claims. (Cl. 73—105)

This invention relates to apparatus for measuring or indicating the roughnesses or undulations of a surface, wherein a feeler or stylus is traversed along the surface and its movements approximately normal to the surface during such traversing are measured or indicated.

In such apparatus it is common practice to employ a curved skid which engages the surface under test over a fairly extensive area and constitutes a reference datum for the measurement of the working movements of the feeler or stylus approximately normal to the surface. It has now been found that such a skid may constitute a serious source of error in the measurement or indication of the roughnesses or undulations of a surface. Thus the wavelength of the undulations of the surface can be such that the skid cannot possibly span several crests and must therefore itself rise and fall as it traverses the surface. If the feeler or stylus rises or falls with the skid over such relatively long wave undulations, the effect is to suppress the undulations altogether as far as the measurement or indication is concerned, whilst if the conditions are such that the feeler or stylus rises as the skid falls, as can quite possibly happen, the undulations are falsely exaggerated. The error depends inter alia on the wavelength of the undulations, itself an unknown quantity, and whilst it is true that for a given wavelength, the error could be reduced or eliminated by increasing the radius of the skid, this remedy exposes the apparatus to the possibility of even greater errors for longer wavelengths in the event of any slight tilting of the apparatus relatively to the test surface.

Such uncertainty in the accuracy of the measurement can be eliminated by resting the skid not on the test surface itself but on an accurately smooth auxiliary surface lying parallel thereto, but such auxiliary surface is bound to wear as the result of the movement of the skid over it, and the least trace of wear may introduce a material error, bearing in mind the minute quantities which are being measured.

The present invention has for its object to provide improved apparatus in which the errors due to the use of a skid are avoided altogether.

To this end the apparatus according to the invention comprises a feeler or stylus for engaging the surface under test, means for traversing the feeler or stylus along the surface, a detector member traversed with the feeler or stylus and movable in accordance with the working movements thereof approximately normal to the test surface, a reference member having a reference surface magnetically or electrically coupled with the detector member through a gap which is varied by the movements of the detector member in accordance with the working movements of the feeler or stylus, the reference surface constituting a datum with respect to which such working movements can be measured, and means whereby the variable magnetic or electric coupling controls a measuring or indicating instrument. Conveniently, the reference surface is maintained stationary relative to the test surface during the traversing movement and lies substantially parallel thereto and to a guide or guides constraining the traversing movement.

The reference member may be made of magnetic material to form part of a magnetic circuit, which includes the detector member and the gap or gaps and is linked with a coil or coils controlling the measuring or indicating instrument. Alternatively, the coupling may be of the electromagnetic induction type depending on changes in eddy current losses, such losses or the inductance or capacitance variations controlling a resonant circuit which controls the measuring or indicating means. In a further alternative the coupling is of the electrostatic type depending on the capacitance of the variable gap.

For the investigation of nominally plane surfaces, or of cylindrical surfaces in a direction parallel to the axis, or more generally of any "ruled" surfaces along straight line generators thereof, it will be convenient to employ a flat reference surface or surfaces, and in such cases traversing may be effected along the desired straight line path by longitudinal movement of a rod in guides carried by an arm which also carries the reference member, the arm being pivoted to an adjustable bracket and being provided with a foot resting on the test surface.

In the case of surfaces of revolution, traversing may be effected along a circular path by relative rotation between two parts, one of which carries the feeler or stylus and the detector member, whilst the other carries the test surface and the reference member, the reference surface being in the form of a cylinder or other surface of revolution.

With either arrangement a common support for the feeler or stylus and the detector member is preferably pivoted to the rod or other traversing element (or to a part carried thereby) by means of one or more ligament hinges.

It will often be preferable to provide two detector members, each coupled with a reference surface through a gap, the two members being so arranged that a working movement of the feeler or stylus causes one gap to be increased and the other decreased, the measuring or indicating instrument being operated differentially in accordance with the variations of the two couplings.

Figure 2:
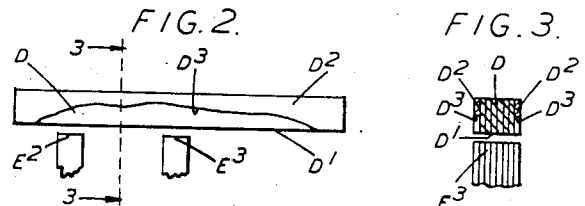
Figure 3:
Figure 4:
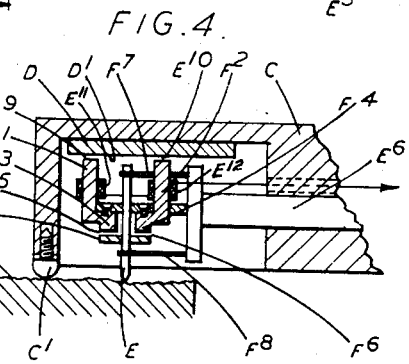
Figure 5:
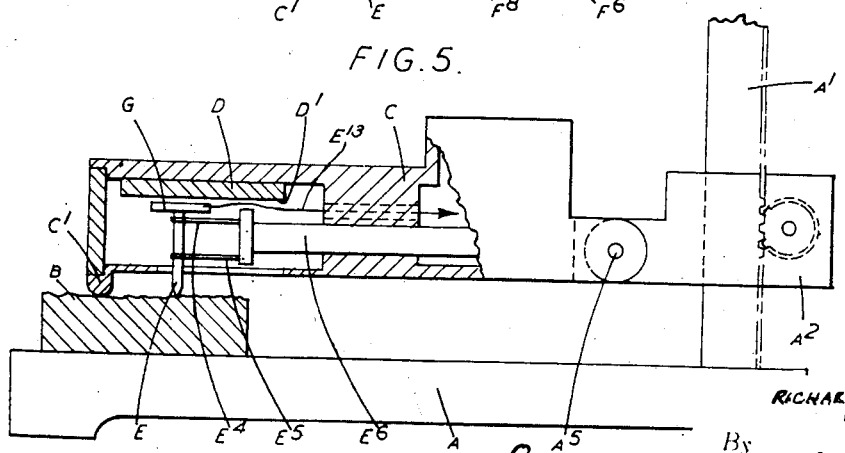
Figure 10:
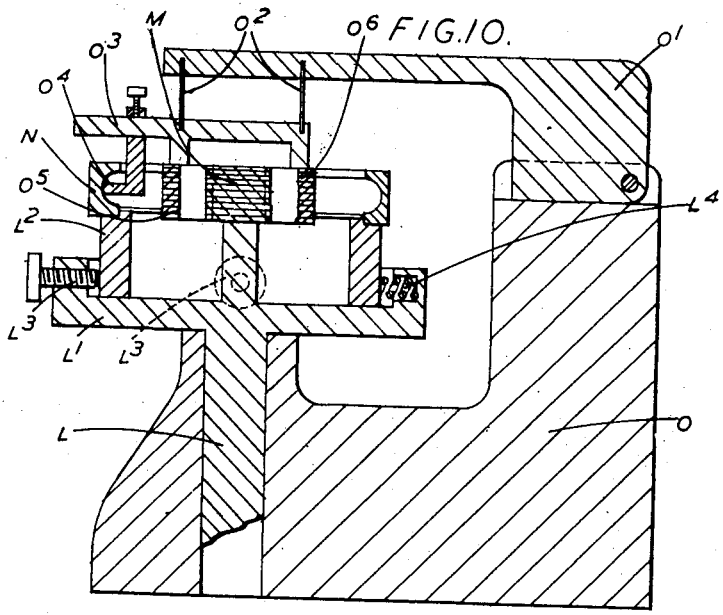
Figure 11:
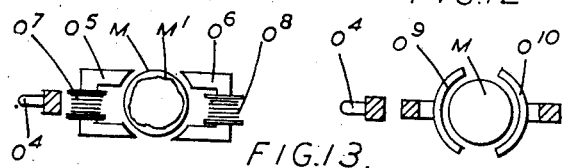
Figure 12:
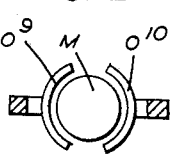
Figure 13:
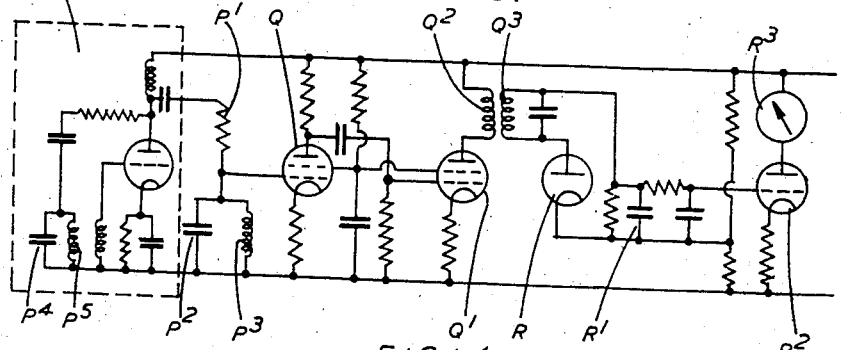
Figure 14:
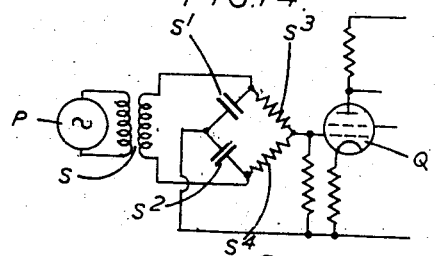

The invention may be carried into practice in various ways, but some convenient alternative constructions according thereto are illustrated by way of example in the accompanying drawings, in which Figure 1 is a sectional view of a simple construction employing a magnetic coupling, Figures 2 and 3 are detached views on a larger scale of the reference member employed in the construction of Figure 1, Figure 3 showing a section on the line 3—3 of Figure 2, Figure 4 illustrates a modification of the arrangement of Figure 1, Figure 5 shows a construction analogous to that of Figure 1 but employing an electrostatic coupling, Figures 6 and 7 illustrate a construction having differentially arranged couplings, Figure 8 shows a further alternative using electrostatic couplings, Figure 9 illustrates a magnetic analogue of the construction of Figure 8, Figures 10 and 11 show a construction for investigating curved surfaces, Figure 12 is a view similar to Figure 11 illustrating a modified arrangement, Figures 13 and 14 illustrate diagrammatically two convenient electric circuit arrangements for use with the constructions of Figures 1–12, and Figure 15 shows diagrammatically a further alternative using an electromagnetic induction coupling.

In the construction of Figure 1, the apparatus comprises a base A for supporting the object whose surface indicated at B is to be investigated, such surface extending horizontally. It will be assumed for convenience of description that the test surface B is a nominally plane surface. A vertical pillar $A^1$ extends up from one end of the base A and serves to carry a bracket $A^2$, which can be adjusted, for example by a rack $A^3$ and pinion $A^4$, to any desired height on the pillar $A^1$. An arm C is pivoted at $A^5$ to this bracket $A^2$ and is provided near its free end with a foot $C^1$ which rests on the test surface B, the bracket $A^2$ being so adjusted on the pillar $A^1$ that when the foot $C^1$ is on the surface B, the arm C is substantially horizontal.

Near its free end the arm C is provided with a slot $C^2$ through its under surface affording access to a main chamber $C^3$ within the arm. To the top wall of this chamber $C^3$ is secured a reference member D of magnetic material having an optically flat lower surface $D^1$, which should lie accurately parallel to the test surface B when the bracket $A^2$ is properly adjusted on the pillar $A^1$. This member D is built up of a stack of laminations, as shown in Figure 3, the plane of each lamination being verical and extending in the direction of the length of the arm C. Thus the optically flat reference surface $D^1$ is formed by polishing the surface constituted by the lower edges of the laminations.

The stylus E projects through the slot $C^2$ in the underside of the arm C from the bottom of a U-shaped magnetic core $E^1$ the upper ends $E^2$, $E^3$ of which constitute pole pieces disposed close beneath but out of contact with the reference surface $D^1$. This core $E^1$ is supported by a pair of flat spring ligament hinges $E^4$, $E^5$ extending horizontally one above the other from the end of a horizontal traversing rod $E^6$, which extends through bearing guides $C^4$ within the arm C towards the pivot end of the arm, the guides being so arranged that the rods can slide longitudinally in a direction accurately parallel to the reference surface $D^1$ and to the laminations of the reference member D. At its inner end, towards the pivot $A^5$ of the arm, the traversing rod $E^6$ enters a second chamber $C^5$ within the arm, and is connected therein to driving mechanism for traversing the arm.

This driving mechanism may be arranged in various ways, but is preferably of the kind described in United States patent specification No. 2,329,084, wherein the stylus can be traversed in the forward direction at any one of two or more different speeds, and can be quickly reset to its starting position ready for another traverse. The provision of different speed drives is convenient for the operation of different types of measuring or indicating instrument. For instance, a relatively slow speed of drive is desirable for use with a pen-recording instrument to give a trace of a cross-section of the surface, and two different slow speed rates can usefully be employed respectively when the roughness of a short stretch of the surface is to be plotted and when the general waviness of a longer stretch of the surface is under investigation. A somewhat higher speed of traverse is however desirable when a measurement is to be obtained of what may be termed the "average" roughness of a stretch of the surface.

The operation of the measuring or indicating instrument is controlled electrically by one or more coils $E^7$, $E^8$ linked with the U-shaped core $E^1$. Whilst such coil or coils may be supported by the core $E^1$, it will usually be preferable for them to be carried on the end of the traversing rod $E^6$, so as to avoid unduly high inertia affecting the working movements of the stylus E.

Such inertia is still further reduced in the modified arrangement shown in Figure 4 by dividing the U-shaped core into two parts $F^1$, $F^2$ and mounting it together with the coil or coils $E^{11}$, $E^{12}$ directly on the traversing rod $E^6$, and providing as detector member a light armature F directly connected to the stylus E and separated by a pair of airgaps $F^5$, $F^6$ from additional pole pieces $F^3$, $F^4$ provided at the bottom of the core parts $F^1$, $F^2$, where it is divided. The magnetic circuit thus includes four airgaps $E^9$, $E^{10}$, $F^5$, $F^6$ of which only the lower two $F^5$, $F^6$ between the core $F^1$, $F^2$ and the armature F, are affected by the working movements of the stylus E. The dimensions of the four airgaps are so chosen that any slight change in the upper airgaps $E^9$, $E^{10}$, due for example to some slight irregularity in the traversing movement, is automatically balanced out by an opposite change in the lower airgaps $F^5$, $F^6$, so that the total reluctance of the magnetic circuit varies only in accordance with the working movements of the stylus E. The armature F and stylus E are connected to the traversing rod $E^6$ by a pair of ligament hinges $F^7$, $F^8$.

In order to compensate for any slight errors which may arise in these arrangements owing to lack of uniformity of permeability along the reference surface $D^1$ or to end effects, an additional lamination $D^2$ with an appropriately deformed or cut-away edge $D^3$ may be provided on one or on each side of the stack, as shown in Figures 2 and 3.

Figure 5 shows a further variant in which the magnetic coupling is replaced by an electrostatic coupling. The arrangement shown is the analogue of that shown in Figure 1, and differs therefrom in that the reference member D is made of conducting material so that its reference surface $D^1$ constitutes a condenser plate cooperating with a second condenser plate G, which constitutes the detector member and is directly connected to the stylus E so as to be movable therewith. An electrical conductor or lead $E^{13}$ connects the condenser G with the indicating instrument, the other plate D of the condenser being grounded. With this arrangement the variations in the electrostatic capacity of the coupling, instead of in the magnetic reluctance, due to movements of the stylus control the measuring or indicating instrument.

A higher degree of accuracy can be obtained in the foregoing constructions by employing a differential arrangement, and Figures 6 and 7 show by way of example, such an arrangement as applied to the electrostatic construction of Figure 5. In this modification, the reference member D is optically polished on both sides to provide two parallel reference surfaces $D^2$, $D^3$. Two detector members, which in the example shown consist of two condenser plates H, $H^1$, cooperate respectively with the two reference surfaces $D^2$, $D^3$ to form the two differential couplings, and are carried by a support $H^2$ carrying the stylus E. This support $H^2$ is forked to pass the reference member D and, as in the previous constructions, is mounted on a pair of ligaments $H^3$, $H^4$ carried by the traversing rod $E^6$.

Thus as the stylus E rises the lower variable airgap between the detector plate $H^1$ and the reference surface $D^3$ will be increased and the upper variable airgap between the plate H and the surface $D^2$ correspondingly decreased. The two condensers formed by these members are electrically connected up, as will be described later so as to influence the measuring or indicating instrument differentially.

Figure 6 also serves to show a further feature, applicable to any of the arrangements, namely that the traversing rod $E^6$ is made hollow to accommodate the electrical leads $H^5$ passing from the detector members H, $H^1$ to the electrical parts of the apparatus for controlling the measuring or indicating instrument. In the example illustrated the ligaments $H^3$, $H^4$ serve as parts of the electrical connections, the support $H^2$ and the end of the traversing rod $E^6$ being made of insulating material. The connecting leads should be so positioned within the apparatus that their stray capacitances are constant.

Figure 8 shows another construction, which is especially convenient for use for instance for the examination of the internal surface of a small hole, as indicated at $B^1$. In this construction the stylus E is mounted on the end of a relatively long lever J pivoted at $J^1$ to the bottom of a bracket $J^2$ on the end of the traversing rod $E^6$. The detector member, again in the form of a condenser plate $J^3$, is mounted at the inner end of the lever $J^1$ and cooperates with the lower surface $D^3$ of the reference member D. A second condenser plate $J^4$ carried by the bracket $J^2$ cooperates with the upper surface $D^2$ of the reference member; the two reference surfaces $D^2$, $D^3$ being parallel as in the differential arrangement of Figure 6. The two condensers, thus formed, are so proportioned and so connected up, that any change in the airgap between the plate $J^4$ and the surface $D^2$, arising for example from any slight irregularity in the traversing movement, will be automatically balanced out by the corresponding change in the other airgap due to rocking of the lever J about the stylus E as fulcrum. The rocking of the lever J about its pivot $J^1$ due to working movements of the stylus approximately normal to the test surface $B^1$ will of course affect only the airgap between the plate $J^3$ and the reference surface $D^3$, the consequent capacity change being effective to operate the measuring or indicating instrument.

Figure 8 also serves to show a modification in the mounting of the arm C and the driving mechanism for the traversing rod $E^6$, this modification being equally applicable to the other constructions. In this modification the driving mechanism (diagrammatically shown as a cam K driving a lever $K^1$ connected through a link $K^2$ to the traversing rod, with a spring $K^3$ holding the lever in engagement with the cam), instead of being accommodated within a chamber $C^5$ in the arm C, is housed in a casing $K^4$ which replaces the bracket $A^2$ and to which the arm C is pivoted at $K^5$. It is preferable for the pivot axis to be substantially in alignment with the traversing rod $E^6$, and to permit this without fouling of the parts the pivot $K^5$ consists of two coaxial pivot pins engaging in the forked end $C^6$ of the arm C.

Figure 9 shows the magnetic analogue of the arrangement of Figure 8 and differs therefrom in that the condenser plate $J^4$ is replaced by a pole piece $J^5$ carried by the bracket $J^2$ on the end of the intermediate portion $J^8$ of the traversing rod $E^6$ and coacting with the upper surface $D^2$ of the reference member D, whilst the condenser plate $J^3$ carried by the lever J is replaced by a magnetic core $J^6$, which is carried by the intermediate portion $J^8$ of the traversing rod $E^6$ and coacts at its upper end with the lower surface $D^3$ of the reference member and at its lower end with an armature $J^7$ on the lever J. The bracket $J^2$ and core $J^6$ are encircled by coils $E^{14}$, $E^{15}$ connected in the electrical circuit of the indicating instrument. The three airgaps thus formed are so proportioned that any variation of the magnetic coupling between the polepiece $J^5$ and the reference surface $D^2$, due to any slight irregularity in the traversing movement, will balance out the corresponding variations in the couplings at the upper and lower ends of the core $J^6$, whilst the measuring movements of the stylus E will affect only the coupling between the armature $J^7$ and the lower end of the core $J^6$.

It will be appreciated that the compensation afforded in the arrangements of Figures 8 and 9 for irregularities in the traversing movement will be accurate only for slight iregularities, but in practice there is no great difficulty in providing a high degree of accuracy in the guiding of the traversing rod and thereby in keeping any slight transverse movement within the small range for which the compensation is sufficiently accurate.

The foregoing arrangements all employ a straight-line traversing movement with an optically flat reference surface and are suitable for the investigation of plane or cylindrical or conical surfaces or of any other "ruled" surfaces, within the limits imposed by the necessity of traversing only along the straight-line generators of such surfaces. The invention is however not limited to the investigation of "ruled" surfaces and can be employed also for curved surfaces not generated by straight lines. The arrangement of Figures 10 and 11 is suitable for use generally with surfaces of revolution, traversing being effected around a circular path. A typical instance of such use is to test the smoothness and the accuracy in shape of ball races, with particular reference to "chatter" or waviness. For this purpose (as in other cases where the waviness or undulations of the surface are to be investigated) it is preferable to use a ball-ended feeler rather than a relatively sharp stylus, such as is required for investigating surface roughness.

This arrangement consists essentially of two relatively rotatable parts, one of which comprises a support for the object whose surface is to be tested and a reference member having an optically smooth cylindrical reference surface, whilst the other includes the feeler or stylus and the detector member coupled with such reference surface. In the case when the object is of relatively small mass and can conveniently be used with a cylindrical reference member of small size mounted within it, it will commonly be more convenient for these parts to be rotatable for traversing purposes on a fixed base carrying the feeler or stylus and detector member, but in other instances where the object itself is heavy or is of such shape as to require the use of a relatively large reference member with an internal cylindrical reference surface, the inverse arrangement will usually be more convenient.

Thus in one practical construction of this arrangement a vertical rotatable spindle L carries a reference member M of magnetic material with an optically smooth external cylindrical reference surface approximately coaxial with the axis of rotation. This reference member M is built up of horizontal disc-shaped laminations, and may have an additional lamination at the top or bottom (or both) of the stack having an appropriately shaped edge to correct for end effects or non-uniform permeability (as indicated at $M^1$ in Figure 11). The spindle L also carries a platform $L^1$ on which a support $L^2$ for the object N is adjustably mounted, the adjustment (consisting as shown of a pair of adjusting screws $L^3$ and cooperating springs $L^4$) permitting centering of the object N with respect to the axis of the reference cylinder M to be effected with the desired degree of accuracy. Thus when the roundness of the surface is being investigated, the object N should be centred sufficiently accurately for the indication to lie within the limits of the scale throughout the whole revolution, whilst when "chatter" is being investigated a smaller rotational movement will usually suffice and less accurate centering will suffice.

The spindle L may be provided with suitable means for rotating it slowly and is journalled in a fixed base O, to which is pivoted an arm $O^1$, which extends across above the reference member M and carries a pair of parallel ligament hinges $O^2$ on which the support $O^3$ for the feeler or stylus $O^4$ and detector member is suspended. The feeler or stylus $O^4$ is preferably adjustably mounted on such support $O^3$ so that its radial distance from the axis of the reference cylinder M can be altered to suit the radius of the object surface to be tested. The pivot for the main arm $O^1$ enables slight adjustment to be made to suit the exact height at which the feeler or stylus $O^4$ is to engage the test surface and to suit the desired working pressure of the feeler or stylus on the surface. The reference surface need not be cylindrical and may have the form of any other surface of revolution.

The magnetic circuit can be arranged in various ways generally analogous to those described above for a straight-line traversing movement. The use of a cylindrical reference surface readily lends itself to a differential arrangement and there are preferably two detector members $O^5$, $O^6$ on opposite sides of the reference member M. Each detector member may consist of a U-shaped magnetic core having two pole pieces close to the reference surface, so that the working movements of the feeler or stylus $O^4$ will cause one pair of airgaps to increase as the other pair decreases, and such cores may carry the coils $O^7$, $O^8$ for differentially controlling the measuring or indicating instrument. Alternatively, in the manner described above, the coils $O^7$, $O^8$ may be directly carried by the main arm $O^1$ so as to be linked with the cores $O^5$, $O^6$ carried by the support $O^3$ for the feeler or stylus suspended from the arm, or again both the coils and intermediate core members may be carried by the arm, so that the support has only relatively light armatures to carry.

The electrostatic analogue of the arrangement of Figures 10 and 11 differs only in the use of a conducting reference member M and of detector members in the form of arcuate condenser plates $O^9$, $O^{10}$ (as shown in Figure 12) in place of the corresponding parts shown in Figure 11.

With all the foregoing arrangements the manner in which the variable capacitances or inductances control the operation of the measuring or indicating instrument may vary, but in general electrical circuits analogous to those described in United States patent specification No. 2,344,217 are suitable. Two convenient alternative circuit arrangements are illustrated in Figures 13 and 14.

In the arrangement of Figure 13, an alternating current generated by an oscillator is modulated, using amplitude or frequency or phase modulation, in accordance with the capacitance or inductance variations produced by the stylus movement, the resultant output after amplification being rectified and smoothed and passed to a D. C. amplifier controlling the meter. The oscillator is shown at P and feeds a high impedance $P^1$ in series with a tuning circuit consisting of a capacitance $P^2$ in parallel with an inductance $P^3$, the output being supplied to the grid of a first amplifying valve Q. The valve Q is conveniently of the screened grid type and passes its output to a second amplifying valve $Q^1$, which in turn feeds the primary $Q^2$ of a transformer, the output of whose secondary $Q^3$ is rectified by a diode R. This rectified output is passed through a smoothing circuit $R^1$ to the grid of a D. C. amplifying valve $R^2$, whose anode circuit is connected to the instrument indicated at $R^3$, the actual connection being chosen to suit the type of instrument employed (for example a pen recorder or an integrating meter) in the manner described in the specifications above mentioned.

In this arrangement the capacitance or inductance varied by movement of the stylus is constituted in the case of amplitude modulation by the capacitance $P^2$ or the inductance $P^3$, or in the case of frequency modulation by a capacitance $P^4$ or inductance $P^5$ forming part of the oscillator P. It will be appreciated that although only a single condenser or a single coil is shown in each case in the diagram, the actual capacitance or inductance may consist of a group of suitably interconnected condensers or coils, as described above with reference to the actual constructions illustrated.

In the case of differentially arranged condensers or coils, as for example in the constructions of Figures 6 and 7 and Figures 10 to 12, it will often be more convenient to utilise a bridge circuit, as shown in Figure 14. In this modification the oscillator P is connected through a transformer S to the input terminals of a bridge, two of the arms of which contain the two condensers $S^1$, $S^2$ (or coils as the case may be) whilst the other two arms contain balancing impedances $S^3$, $S^4$, the output terminals of the bridge being used to feed the grid circuit of the first amplifying valve Q, which together with the rest of the circuit (not shown) is arranged as in Figure 13.

A generally similar bridge circuit may also be used in a non-differential arrangement, if desired, the second condenser or coil in this case not being controlled by the stylus movements but being operated by hand to give a backing-off control to bring the resultant output properly within the scale of the instrument.

Whilst in the foregoing arrangements it will usually be preferable to employ either a magnetic coupling or an electrostatic coupling, as described, this is not essential to the invention and other forms of coupling may be employed. For instance, the detector member may carry a coil or coils so arranged as to induce eddy currents in the reference member, this arrangement being applicable to various constructions closely similar to those above described employing magnetic couplings. The eddy current losses or the inductance or capacity of the circuit, as varied by the alteration in the airgap or airgaps due to the working movements of the stylus, may then be applied through a resonant circuit to the instrument, with amplification and rectification as desired. One such arrangement is illustrated by way of example in Figure 15.

In this example the detector member consists of a coil T disposed in such relationship to the reference member D as to induce eddy currents therein. The coil T and the stylus E are together supported on ligaments $E^4$, $E^5$ carried by the traversing rod $E^6$, and the arrangement is otherwise generally similar to that of Figure 1. Figure 15 also shows a simple electrical circuit which can be employed in this case, this circuit being closely similar to that of the oscillator P in Figure 13. The meter $T^1$, provided with a backing-off control indicated at $T^2$, is connected in the main anode circuit of a valve $T^3$ in series with a tapped part of the coil T, the whole of the coil T being associated with a condenser $T^4$ to form a resonant circuit connected to the grid of the valve.

The manner in which the reference surface or surfaces are maintained parallel with the test surface and with the direction of traversing may also vary. Thus, in the straight line traversing arrangements above described, the arm carrying the reference member also carries the guides for the traversing rod, so that the reference surface will always be parallel to the direction of traversing within the limits of manufacturing accuracy, whilst parallelism between the direction of traversing and the test surface is effected by adjustment of the bracket to which the arm is pivoted. The parts are so set initially that the two surfaces automatically become parallel when the stylus occupies a predetermined position relatively to the traversing rod, corresponding to the middle of the chart when a pen-recorder is used as the measuring instrument. Other arrangements, for example analogous to those described in United States patent application Serial Number 458,560 filed September 16, 1942, now Patent Number 2,363,691, November 28, 1944, may however be employed if desired. It is not essential that the reference surface or surfaces should be wholly parallel to the test surface, provided that each surface is accurately parallel to the direction of transversing and that the working movements of the stylus approximately normal to the test surface will produce the desired variation in the coupling or couplings.

Although it is preferable that the reference surface should be optically flat or optically smooth as described above, polishing to the degree necessary for optical smoothness is not essential to the invention, and satisfactory results can be obtained if the surface is worked only to an extent such that its residual roughness will not have an appreciable effect on the reluctance or capacitance of the airgap or airgaps associated with the surface. Further dielectric or non-magnetic fluids other than air may be employed in the gap or gaps, if desired.

It will be appreciated that the arrangements and modifications described above have been given by way of example only and that the invention may be carried into practice in other ways.

What I claim as my invention and desire to secure by Letters Patent is:

1. Apparatus for measuring the roughnesses or undulations of a surface, comprising in combination a stylus for engaging the surface under test, means for effecting relative movement between the stylus and the test surface whereby the stylus is traversed along said surface, guiding means for constraining the traversing movement to take place substantially parallel to the test surface, a detector member, means whereby the detector member is traversed relatively to the test surface with the stylus but is movable during traversing in accordance with the working movements of the stylus approximately normal to the test surface, a reference member which remains stationary relatively to the test surface during the traversing movement and is provided with a reference surface coupled with the detector member through at least one gap which is caused by the relative movement between the parts to travel along the reference surface during traversing and is varied by the movements of the detector member in accordance with the working movements of the stylus, said reference surface lying substantially parallel to the direction of traversing and constituting a datum with respect to which the working movements of the stylus can be measured, a measuring instrument, and means whereby said variable coupling controls such instrument.

2. Apparatus for measuring the roughnesses or undulations of a surface, comprising in combination a stylus for engaging the surface under test, means for traversing the stylus along the surface, a detector member, means whereby the detector member is traversed with the stylus but is movable during traversing in accordance with the working movements of the stylus approximately normal to the test surface, a reference member which remains stationary relatively to the test surface during the traversing movement and is provided with a reference surface constituting a datum with respect to which the working movements of the stylus can be measured, an intermediate member coupled through at least one gap with the reference surface, guiding means and means whereby the intermediate member is traversed with the stylus but remains unaffected by the working movements thereof, such intermediate member being coupled with the detector member through at least one gap which is caused by the relative movement between the parts to travel along the reference surface during traversing and is varied by the movements of the detector member in accordance with the working movements of the stylus, a measuring instrument, and means whereby said variable coupling controls such instrument.

3. Apparatus for measuring the roughnesses or undulations of a surface, comprising in combination a stylus for engaging the surface under test, a detector member, a reference member having two accurately parallel reference surfaces lying substantially parallel to the test surface, an intermediate member constituted by two limbs respectively coupled through gaps with the two reference surfaces, one of the limbs also being coupled through a gap with the detector member, a lever pivoted to the other limb of the intermediate member and carrying the stylus and the detector member, means for traversing the intermediate member together with the stylus and detector member in a direction substantially parallel to the test surface and to the reference surfaces, a measuring instrument, and electrical means responsive to variations in the couplings for controlling such instrument in accordance with working movements of the stylus approximately normal to the test surface during traversing, the three gaps being so dimensioned in relation to the lever ratio that the effective coupling variations are unaffected by any slight movement of the limbs of the intermediate member normal to the reference surfaces.

4. Apparatus as claimed in claim 1, in which the reference member is made of magnetic material and forms part of a magnetic circuit which includes the detector member and the coupling gap, and the means controlling the measuring instrument includes at least one coil linked with such magnetic circuit.

5. Apparatus as claimed in claim 3, in which the reference member is made of magnetic material and forms part of a magnetic circuit which includes the detector member and the three gaps, and the electrical means responsive to the coupling variations includes at least one coil linked with such magnetic circuit.

6. Apparatus as claimed in claim 1, in which the reference member is made of laminated magnetic material with its laminations lying parallel to the directions of the traversing and working movements of the stylus and forms part of a magnetic circuit including the detector member and the coupling gap, and the means controlling the measuring instrument includes at least one coil linked with such magnetic circuit.

7. Apparatus as claimed in claim 1, in which the reference member and the detector member are made of electrically conducting material and the variable capacitance of the coupling gap is utilised for the control of the measuring instrument.

8. Apparatus for measuring the roughnesses or undulations of a surface of revolution, comprising a stylus for engaging the surface under test, a detector member, a reference member having a reference surface of circular section substantially coaxial with the test surface, an element carrying the test surface and the reference member, a second element carrying the stylus and the detector member, means for effecting relative rotation between the two elements substantially about the axis of the reference surface whereby the stylus is traversed in a circular path along the test surface, the detector member being coupled with the reference surface through a gap, means whereby the working movements of the stylus approximately normal to the test surface during traversing cause the detector member to move relatively to the reference surface and thereby to vary the coupling gap, a measuring instrument, and means whereby the variable coupling controls such instrument.

9. Apparatus for measuring the roughnesses or undulations of a surface of revolution, comprising a reference member having a reference surface of circular section substantially coaxial with the surface under test, an element carrying the test surface and the reference member, a second element rotatable relatively to the first substantially about the axis of the reference surface, a stylus for engaging the test surface, a detector member coupled with the reference surface through a gap, a common support for the stylus and the detector member, at least one ligament hinge by which such support is pivotally connected to the second element, means for effecting relative rotation between the two elements whereby the stylus is traversed in a circular path along the test surface, the working movements of the stylus approximately normal to the test surface during traversing being transmitted to the detector member and thereby causing the coupling gap to be varied, a measuring instrument, and means whereby the variable coupling controls such instrument.

10. Apparatus for measuring the roughnesses or undulations of a surface of revolution, comprising a reference member having a reference surface of circular section substantially coaxial with the surface under test, a stylus for engaging the test surface, two detector members each coupled with the reference surface through a gap, an element carrying the test surface and the reference member, a second element carrying the stylus and the two detector members, means for effecting relative rotation between the two elements substantially about the axis of the reference surface whereby the stylus is traversed in a circular path along the test surface, means whereby the working movements of the stylus approximately normal to the test surface during traversing are transmitted to the detector members and thereby cause one gap to be increased and the other gap to be decreased, a measuring instrument, and means whereby the two variable couplings differentially control the measuring instrument.

11. Apparatus as claimed in claim 9, in which the reference member is of magnetic material and forms part of a magnetic circuit including the detector member and the coupling gap, and the means controlling the measuring instrument include a coil linked with such magnetic circuit.

12. Apparatus for measuring the roughnesses or undulations of a surface, comprising in combination a support adjustable relatively to the surface under test, a supporting arm pivoted to such support and provided with a foot resting on the test surface, a reference member carried by the supporting arm and having a reference surface, a stylus for engaging the test surface, a detector member coupled with the reference surface through a gap, means for traversing the stylus and the detector member so that the stylus moves along the test surface, a pivotal connection between the stylus and the traversing means, means whereby the working movements of the stylus approximately normal to the test surface during traversing are transmitted to the detector member and cause the coupling gap to be varied, a measuring instrument, and means whereby the variable coupling controls such instrument, the support being adjusted in use so that with the stylus and foot both in engagement with the test surface the stylus occupies such a position relatively to the traversing means that the reference surface lies substantially parallel to the test surface.

13. Apparatus as claimed in claim 12, in which the reference member is made of magnetic material and forms part of a magnetic circuit which includes the detector member and the coupling gap, and the means controlling the measuring instrument includes at least one coil linked with such magnetic circuit.

14. Apparatus as claimed in claim 12, in which the reference member and the detector member are made of electrically conducting material and the variable capacitance of the coupling gap is utilised for the control of the measuring instrument.

15. The combination with the features set forth in claim 12, wherein the traversing means includes a longitudinally movable rod to which the stylus is pivotally connected, of guiding means for such rod so carried by the supporting arm that the traversing movement of the rod lies substantially parallel to the reference surface.

16. Apparatus for measuring the roughnesses or undulations of a surface, comprising a reference member which remains stationary relatively to the test surface during measuring movement and is provided with two accurately parallel reference surfaces lying approximately parallel to the surface under test, a stylus for engaging the test surface, two detector members respectively coupled through gaps with the two reference surfaces, guiding means and means for traversing the stylus and the detector members so that the stylus moves along the test surface and the gaps travel along the reference surface, means whereby the working movements of the stylus approximately normal to the test surface during traversing are transmitted to the detector members to cause one coupling gap to be increased and the other decreased, a measuring instrument, and means whereby the two variable couplings differentially control such instrument.

17. Apparatus as claimed in claim 16, in which the reference member and the two detector members are made of electrically conducting material and the variable capacitances of the two coupling gaps are utilised for the control of the measuring instrument.

18. Apparatus for measuring the roughnesses or undulations of a surface, comprising in combination a stylus for engaging the surface under test, means for traversing the stylus along the surface, guiding means for constraining the traversing movement to take place substantially parallel to the test surface, a detector member, means whereby the detector member is traversed with the stylus but is movable during traversing in accordance with the working movements of the stylus approximately normal to the test surface, a reference member which remains stationary relatively to the test surface during the traversing movement and is provided with a reference surface lying substantially parallel to the direction of traversing and constituting a datum with respect to which the working movements of the stylus can be measured, an intermediate member coupled through at least one gap with the reference surface, means whereby the intermediate member is traversed with the stylus but remains unaffected by the working movements thereof, whereby the said gap is caused by the relative movement between the parts to travel along the reference surface during traversing, the intermediate member being coupled with the detector member through at least one gap which is varied by the movements of the detector member in accordance with the working movements of the stylus, a measuring instrument, and means whereby the variable coupling controls such instrument.

19. Apparatus for measuring the roughnesses or undulations of a surface, comprising in combination a stylus for engaging the surface under test, means for traversing the stylus along the surface, guiding means for constraining the traversing movement to take place substantially parallel to the test surface, a reference member which remains stationary relatively to the test surface during the traversing movement and is provided with two accurately parallel reference surfaces lying approximately parallel to the test surface, two detector members which are traversed with the stylus and are respectively coupled through gaps with the two reference surfaces whereby such gaps are caused to travel along the reference surfaces during traversing, means whereby the working movements of the stylus approximately normal to the test surface during traversing are transmitted to the detector members to cause one coupling gap to be increased and the other decreased, a measuring instrument, and means whereby the two variable couplings differentially control such instrument.

RICHARD EDMUND REASON.

REFERENCES CITED

The following references are of record in the file of this patent:

UNITED STATES PATENTS

| Number | Name | Date |
| --- | --- | --- |
| 1,796,155 | Leffler | Mar. 10, 1931 |
| 2,171,433 | Powers | Aug. 29, 1939 |
| 2,240,278 | Abbott | Apr. 29, 1941 |
| 2,330,801 | Abbott | Oct. 5, 1943 |
| 2,335,390 | Crist | Nov. 30, 1943 |
| 2,345,022 | Williamson | Mar. 28, 1944 |

FOREIGN PATENTS

| Number | Country | Date |
| --- | --- | --- |
| 539,271 | Great Britain | Sept. 3, 1941 |
| 539,273 | Great Britain | Sept. 3, 1941 |